(12) United States Patent
Mallen

(10) Patent No.: US 6,386,172 B1
(45) Date of Patent: May 14, 2002

(54) VARIABLE BANDWIDTH STRIATED CHARGE FOR USE IN A ROTARY VANE PUMPING MACHINE

(75) Inventor: Brian D. Mallen, Charlottesville, VA (US)

(73) Assignee: Mallen Research Ltd., Charlottesville, VA (US)

( * ) Notice: Subject to any disclaimer, the term of this patent is extended or adjusted under 35 U.S.C. 154(b) by 0 days.

(21) Appl. No.: 09/631,691

(22) Filed: Aug. 2, 2000

(51) Int. Cl.⁷ ................................................. F02B 53/00
(52) U.S. Cl. .................. 123/243; 123/688; 123/568.12; 418/100; 418/159; 55/84; 138/45; 138/46; 60/284; 60/297
(58) Field of Search ................................. 123/243, 242, 123/688, 568.12; 418/159, 100; 138/45, 46; 55/84; 60/284, 297

(56) References Cited

U.S. PATENT DOCUMENTS

| | | | | |
|---|---|---|---|---|
| 2,345,561 A | * | 4/1944 | Allen, Jr. ..................... | 123/243 |
| 3,104,680 A | * | 9/1963 | Orlin ............................ | 138/45 |
| 3,646,971 A | * | 3/1972 | Godet .......................... | 138/46 |
| 3,868,929 A | * | 3/1975 | Ishikawa .................... | 418/100 |
| 3,968,649 A | * | 7/1976 | Edwards ..................... | 60/297 |
| 4,026,682 A | * | 5/1977 | Pausch ........................ | 55/84 |
| 4,241,713 A | * | 12/1980 | Crutchfield ................ | 123/243 |
| 5,415,141 A | * | 5/1995 | McCam ...................... | 123/243 |
| 5,435,129 A | * | 7/1995 | Hosoya et al. .............. | 60/284 |
| 5,615,661 A | * | 4/1997 | Suzuki ........................ | 123/688 |
| 5,711,268 A | * | 1/1998 | Holdampf ................... | 123/243 |
| 6,164,071 A | * | 12/2000 | Shao et al. ............. | 123/568.12 |

* cited by examiner

Primary Examiner—Thomas Denion
Assistant Examiner—Thai-Ba Trieu

(57) ABSTRACT

A rotary vane combustion engine is provided that has a plurality of vane cells. This rotary vane combustion engine includes a rotor having a plurality of vanes; a stator enclosing the rotor to form a plurality of vane cells between the plurality of vanes; one or more intake ports for providing intake charge to the vane cells; one or more exhaust ports for removing exhaust gas from one of the vane cells; and a variable bandwidth fuel-air source connected to at least one of the intake ports for providing a discrete band of mixed fuel and air having a desired axial width to each of the plurality of vane cells. By providing a discrete band of fuel and air to each of the vane cells, this rotary vane combustion engine will allow the machine or engine to run at lower power without requiring it to run a vacuum to lower the density of mixed fuel and air. As a result, vacuum pumping losses can be substantially eliminated and the machine or engine can operate more efficiently.

22 Claims, 8 Drawing Sheets

VARIABLE BANDWIDTH STRIATED CHARGE FOR USE IN A ROTARY VANE PUMPING MACHINE

BACKGROUND OF THE INVENTION

1. Field of the Invention

The present invention generally relates to rotary vane pumping machines, and more particularly, to a variable bandwidth striated charge for use in reducing vacuum pumping losses in a rotary vane internal combustion engine.

2. Description of Related Art

In the operation of conventional internal combustion engines in many applications (e.g. automotive), less than full power is required. It is during these partial-power situations that a great deal of an engine's fuel efficiency can be lost. A typical automotive engine may have an efficiency of 30% at full load, but in real world driving at partial load, this efficiency often decreases to 10% or lower. It is widely accepted that reducing the partial-output efficiency losses is at least as important in improving overall fuel economy in automobiles as achieving minor improvements in peak engine efficiency at full load.

Otto cycle (spark ignition or SI) and diesel (compression ignition or CI) engines have been used extensively in automotive applications. These engines are positive displacement machines. This means that they move air at different rates in roughly linear proportion to the engine speed. The amount of air available for combustion determines the maximum amount of fuel that can be effectively burned and thus the power output. Therefore, one important way of limiting power is to reduce engine speed. Another way of limiting power at a given fuel-air ratio is to restrict the mass flow of air into the engine with a vacuum throttle. Yet another way of limiting power is to reduce fuel flow at a given engine speed and mass flow of air.

Whereas power reduction can result from any of these three methods, significant load reduction can only result from either throttling or leaning of the overall fuel-air ratio for conventional engines. In automotive applications engine speed at a given road speed is typically modified by changing the gearing in discrete steps. Engine speed is rarely continuously variable, and therefore power reduction must often be produced by load reduction alone (i.e., at least one of either throttling or leaning of the overall fuel-air ratio) in many applications such as automotive. Therefore, there exists a need to significantly improve the efficiency at partial load in internal combustion engines in these applications.

The partial-load component of efficiency losses may be broken into two primary contributors, vacuum pumping losses and mechanical friction losses. Both factors contribute significantly to the partial-load component of efficiency losses in SI engines, whereas mechanical friction losses tend to dominate the partial-load component of losses in diesel engines.

FIG. 1 is a graph of efficiency versus load for a standard SI piston engine. Line A shows the engine's efficiency based on losses caused by fuel conversion but without considering vacuum pumping or mechanical friction losses. Line B shows the engine's efficiency based on losses caused by fuel conversion and vacuum pumping losses. Line shows the engine's actual efficiency based on losses caused by fuel conversion, vacuum pumping losses, and frictional losses. As FIG. 1 shows, at lower load levels, the losses in engine efficiency caused by vacuum pumping and mechanical friction losses are significant.

SI engines are typically governed by a throttle, which controls air flow. A roughly stochiometric mixture is usually required to ensure ignition and flame propagation, when initiated by a spark. Diesel engines do not have this narrow mixture requirement, and can control power output by regulating fuel flow without a throttle. The temperature of the air under high compression of a CI engine allows the robust combustion of very lean mixtures.

Although FIG. 1 describes the efficiency versus load for a standard SI piston engine, curves A and C for a standard CI engine would be roughly similar in proportion. Diesel engines have long been recognized for their improved fuel efficiency. The lack of a throttle and associated vacuum pumping losses contributes significantly to the efficiency advantage in many applications such as automotive. However, while diesel engines do not suffer from the same vacuum pumping losses as SI engines, the comparatively high compression of the diesel engine coupled with the lack of throttle increases relative friction losses from many of the rotating bearings, such as the crank, rod, and wristpin bearings.

Furthermore, the friction losses necessarily represent a greater contribution for the diesel engine than for the SI engine if both engines are constrained to the same partial load percentage. This fact can be established on a mathematical basis. By eliminating the bulk of vacuum-pumping losses, the diesel engine gains in efficiency—and thus also in output. Therefore additional load reduction is required to achieve the same output. At a given speed, this additional load reduction will further increase the percentage of mechanical friction losses as the operating point moves toward the origin, in a manner similar to that shown in the curves of FIG. 1.

Therefore, one can see that by substantially reducing only one of either mechanical friction losses or vacuum pumping losses, the other remaining loss will necessarily increase as a percentage loss when constrained to the same output at a given speed. A need therefore exists for a combustion engine which substantially reduces both mechanical friction and vacuum pumping losses so as to provide a substantial improvement in partial load efficiency.

Rotary vane engines can employ roller bearings as primary frictional interfaces and therefore do not suffer from the significant sliding frictional losses of piston engines. However, this dramatic reduction of friction means a larger percentage of the partial load inefficiency comes from vacuum pumping losses in a throttled engine when constrained to the same load, for the mathematical reasons described above. An engine that could simultaneously significantly reduce or substantially eliminate both mechanical friction and vacuum pumping losses at partial loads would offer significant efficiency advantages for many applications such as automotive. A need therefore exists for a low-friction rotary-vane combustion engine that employs a means to significantly eliminate vacuum pumping losses while maintaining the ability to rapidly adjust the load across a wide range of load outputs.

One variety of rotary engines that could be configured under the present invention to avoid vacuum pumping losses are rotary vane combustion engines (more particularly, rotary vane internal combustion engines). This class of rotary vane pumping machine includes designs having a rotor with slots having a radial component of alignment with respect to the rotor's axis of rotation, vanes that reciprocate within these slots, and a chamber contour within which the vane tips trace their path as they rotate and reciprocate is within their rotor slots.

The reciprocating vanes thus extend and retract synchronously with the relative rotation of the rotor and the shape of the chamber surface in such a way as to create cascading cells of compression and/or expansion, thereby providing the essential components of a pumping machine. For ease of discussion, a rotary vane combustion engine will be discussed in detail.

FIG. 2 is a side cross sectional view of a conventional rotary-vane combustion engine. FIG. 3 is an unrolled view of the cross-sectional view of FIG. 2.

As shown in FIG. 2, the rotary engine assembly includes a rotor 10, a chamber ring assembly 20, and left and right linear translation ring assembly plates 30.

The rotor 10 includes a rotor shaft 11, and the rotor 10 rotates about the central axis of the rotor shaft 11 in a counterclockwise direction as shown by arrow "R" in FIG. 2. The rotor 10 has a rotational axis, at the axis of the rotor shaft 11, that is fixed relative to a stator cavity 21 contained in the chamber ring assembly 20.

The rotor 10 houses a plurality of vanes 12 in vane slots 13, and each pair of log adjacent vanes 12 defines a vane cell 14. The contoured stator 21 forms the roughly circular shape of the chamber outer surface. Pairs of opposing vanes 12 are preferably connected through the rotor 10, but may be separate.

The linear translation ring assembly plates 30 are disposed at each axial end of the chamber ring assembly 20, and at least one of the linear translation ring assembly plates includes a linear translation ring 31. The linear translation ring 31 itself spins freely around a fixed hub 32 located in the linear translation ring assembly plate 30, with the axis of the fixed hub 32 being eccentric to the axis 33 of rotor shaft 11. The linear translation ring 31 contains a plurality of linear channels or facets 34 formed on its outer surface 35. The linear channels 34 allow the vanes to move linearly as the linear translation ring 31 rotates around the fixed hub 32. The linear channels or facets 34 could be formed as a separate bearing pad or could be integral to the outer surface 35.

A hot wall combustion insert 26 may be provided along the inner surface of the a chamber ring assembly 20, preferably at or near the point of greatest compression for the vane cells 14. The hot wall combustion insert 26 is a curved surface that forms a part of the wall of the chamber ring assembly 20, along a predetermined circumference in the combustion cycle. The hot wall combustion insert 26 is preferably a ceramic insert having a near zero thermal expansion coefficient.

The hot wall combustion insert 26 is used in the combustion cycle to quickly ignite a fuel-air mixture in a combustion cycle. This hot wall combustion insert 26 maintains a temperature sufficient to combust a fuel-air mixture that is provided in a vane cell 14, and initiates combustion along the entire circumference of the hot wall combustion insert 26. Such a hot wall insert 26 allows a broad source of ignition across the entire insert permitting the robust and reliable combustion of ultra-lean fuel-air mixtures, simultaneously reducing pollution and improving efficiency.

When the present invention is used with internal combustion engines, one or more fuel or fuel-air injecting or induction devices 27 may be used and may be placed on one or both axial ends of the chamber and/or on the outer or inner circumference to the chamber. Each injector 27 may be placed at any position and angle chosen to facilitate equal distribution within the cell or vortices while preventing fuel from escaping into the exhaust stream.

Fresh air or a fuel-air charge, i.e., an intake charge, "I" is provided to the vane engine through an intake port formed in the chamber ring assembly 20 and/or linear translation ring assembly plates 30. Similarly, the fuel-air charge, i.e., exhaust gas, "E" is removed from the vane engine through an exhaust port, also formed in the chamber ring assembly 20 and/or linear translation ring assembly plates 30.

A rotary scavenging disk 40 is disposed along the stator circumference, and is sized such that the rotary scavenging disk 40 extends into the vane cell 14. An outer circumferential edge of the rotary scavenging disk 40 is in sealing proximity with an outer circumferential edge of the rotor 10.

Such a rotary scavenging mechanism extends the benefits of positive-displacement scavenging and vacuum throttle capability to a two-stroke vane engine. By employing such a rotary scavenging mechanism the two-stroke vane engine reaps the efficiency and pollution benefits derived from a four-stroke design without incurring any of the associated power density and mechanical friction penalties and other tradeoffs. In addition, such a rotary scavenging mechanism provides additional or alternative benefits to certain applications, centering around the derived capability to access the vane cells at targeted positions during the pumping cycle, to purge the cell, exchange gases from/to the cell, and/or induct gases into the cell.

The illustrated rotary vane combustion engine thus employs a two-stroke cycle to maximize the power-to-weight and power-to-size ratios of the engine. The intake of the fresh air or fuel-air mixture "I" and the scavenging of the exhaust gas "E" occur at the regions as shown in FIG. 2. One complete engine cycle occurs for each revolution of the rotor 10.

The vane engine shown in FIGS. 2 and 3 operates as follows.

Fresh air or a fuel-air charge is first inducted into a vane cell 14 in an intake cycle 51. Proximate to this intake cycle 51, i.e., either immediately before, during, or immediately after, fuel is combined and/or mixed with the fresh air to create a charge with a desirable fuel-to-air ratio. The mixed fuel and air charge is then compressed during a compression cycle 52, as the rotor 10 continues its motion.

As the vane chamber 14 reaches the hot wall combustion insert 26, a combustion cycle 53 is performed. During the combustion cycle 53, the air and fuel are combusted, causing a dramatic increase in heat and pressure. The initial combustion takes place as a vane cell 14 passes by the hot wall combustion insert 26 during the combustion cycle 53. This combustion involves a planar ignition that spreads radially throughout the vane chamber 14 until the air and fuel in the vane chamber 14 have been substantially combusted.

The combusted fuel and air are then expanded in an expansion cycle 54, and removed via an exhaust cycle 55. In addition, scavenging operations may be performed in the exhaust and/or intake cycles.

FIG. 3 simply shows the operation of FIG. 2 in an 'unrolled' state, in which the circular operation of the vane engine assembly is shown in a linear manner. The progression of the cycles 51, 52, 53, 54, and 55 can be seen quite effectively through FIG. 3. FIG. 3 may also be used to represent the application of the present invention in the embodiment of a vane engine in which the vanes reciprocate with an axial component of motion or in the axial direction.

Vane engines as so configured present major efficiency gains over traditional piston engines, but could benefit substantially from an improved load-adjusting device. Such vane engines derive some of their efficiency gains by using ultra-lean mixtures. As used herein, local mixture or local fuel-air ratio refers to the mixture of the primary fuel-air charge, whereas the overall mixture or ratio refers to the total proportions of air and fuel passing through the engine cells. In most conventional internal combustion engines the overall mixture and the local mixture (as previously defined) are synonymous. Typically, the load output is not primarily governed by adjusting the overall fuel-air ratio in such vane engines, because further leaning of the associated local fuel-air ratio past a point could interfere with robust combustion. Therefore, there exists a need for a low-friction rotary-vane internal combustion engine that employs a means to significantly eliminate vacuum pumping losses while maintaining the ability to rapidly adjust the load across a wide range of load outputs--and which achieves this load adjustment without requiring a throttle plate or significantly modifying the local fuel-air ratio.

SUMMARY OF THE INVENTION

Accordingly, the present invention is directed to a rotary vane combustion engine that substantially overcomes one or more of the problems due to the limitations and disadvantages of the related art.

It is a further object of the present invention to provide a rotary vane engine that can adjust the load output of the engine without a requirement to employ a vacuum throttle plate.

It is a further object of the present invention to provide a rotary vane engine that can adjust the load output of the engine without significantly altering the local fuel-air ratio of the primary fuel-air charge.

It is a further object of the present invention to provide a rotary vane engine that can adjust the load output of the engine over a wide range of loads, speeds, and operating conditions.

In the present invention, a variable bandwidth striated charge is used for inducting, compressing, combusting, expanding, and purging a fuel-air mixture within a rotary vane engine. The width of the striated fuel-air mixture in the vane rotary pump is controlled and varies depending upon the desired load output of the rotary vane engine.

To achieve these and other advantages and in accordance with the purpose of the invention, a rotary vane combustion engine is provided having a plurality of vane cells. The rotary vane combustion engine comprises a rotor having a plurality of vanes; a stator enclosing the rotor to form a plurality of vane cells between the plurality of vanes; one or more intake ports for providing an intake charge to the vane cells; one or more exhaust ports for removing exhaust gas from one of the vane cells; and a variable bandwidth fuel-air source connected to at least one of the intake ports for providing a discrete band of mixed fuel and air having a desired axial width to each of the plurality of vane cells.

The variable bandwidth fuel-air source may further comprise a variable-width intake line for providing the discrete band of mixed fuel and air with the desired axial width to each of the plurality of vane cells. Also, the one or more intake ports may further comprise one or more supplemental air lines for providing supplemental air to a portion of the plurality of vane cells not filled with the discrete band of mixed fuel and air.

The variable width intake line may itself comprise one or more first and second movable intake walls that vary the width of the discrete band of mixed fuel and air provided to each of the plurality of vane cells. The first and second movable intake walls may be attached to first and second fixed intake hinges, respectively and may each rotate or move to vary the width of the discrete band of mixed fuel and air provided to each of the plurality of vane cells. However, the first and second movable intake walls may also be moved laterally with respect to each other, such that each remains parallel to the other, to vary the width of the discrete band of mixed fuel and air provided to each of the plurality of vane cells.

The variable width intake line may also comprise one or more movable intake walls and one or more stationary intake walls. The movable intake wall may moves in relation to the stationary intake wall to vary the width of the discrete band of mixed fuel and air provided to each of the plurality of vane cells.

The variable bandwidth fuel-air source may further comprise a fuel injector attached to the variable-width intake line for receiving fuel and supplemental air and providing combined fuel and air. The variable bandwidth fuel-air source may also comprise a fixed width intake line formed between fuel injector and the variable-width intake line, and the fixed width intake line may house at least one vortex generator for mixing the combined fuel and air.

The variable bandwidth fuel-air source may further comprise a vorticity reducer downstream of the at least one vortex generator for straightening a flow of mixed fuel and air prior to induction into the vane cell. The vorticity reducer may comprise a grid of separate passages housed within the intake line through which mixed fuel and air can flow. The variable bandwidth fuel-air source may further comprise a mixing portion formed between the at least one vortex generator and the vorticity reducer to allow vortices generated by the at least one vortex generator to mix the combined fuel and air.

The one or more exhaust ports may include one or more cool air exhaust ports for removing cool supplemental air, and a combusted gas exhaust port for removing a combusted fuel-air mixture.

The combusted gas exhaust port may further comprise a variable-width exhaust line for removing the combusted fuel-air mixture from the plurality of vane cells, along an exhaust width of the vane cells. The exhaust width is preferably greater than the desired axial width of the discrete band of mixed fuel and air.

The variable width exhaust line preferably comprises one or more first and second movable walls that vary the exhaust width. The first and second movable exhaust walls may be attached to first and second fixed exhaust hinges, respectively and each may rotate to vary the exhaust width. The first and second movable exhaust walls may also be moved laterally with respect to each other, such that each remains parallel to the other, to vary the exhaust width.

The variable width exhaust line may also comprise one or more movable exhaust walls and one or more stationary exhaust walls. In this case, the movable exhaust wall moves in relation to the stationary exhaust wall to vary the exhaust width.

The rotary vane combustion engine may further comprise a catalytic converter connected to the combusted gas exhaust port. In this case, the temperature of the combusted fuel-air mixture is preferably maintained at 200° C. or greater.

The rotary vane combustion engine may further comprise a cool air recirculation line between the one or more exhaust ports and the one or more intake ports for carrying cool air from the one or more exhaust ports to the one or more intake ports. The rotary vane combustion engine may also comprise an intercooler placed along the supplemental air recirculation line for cooling the supplemental air.

BRIEF DESCRIPTION OF THE DRAWINGS

The foregoing and other objects, aspects, and advantages will be described with reference to the drawings, certain dimensions of which have been exaggerated and distorted to better illustrate the features of the invention, and wherein like reference numerals designate like and corresponding parts of the various drawings, and in which.

DETAILED DESCRIPTION OF THE INVENTION

Figure 1:
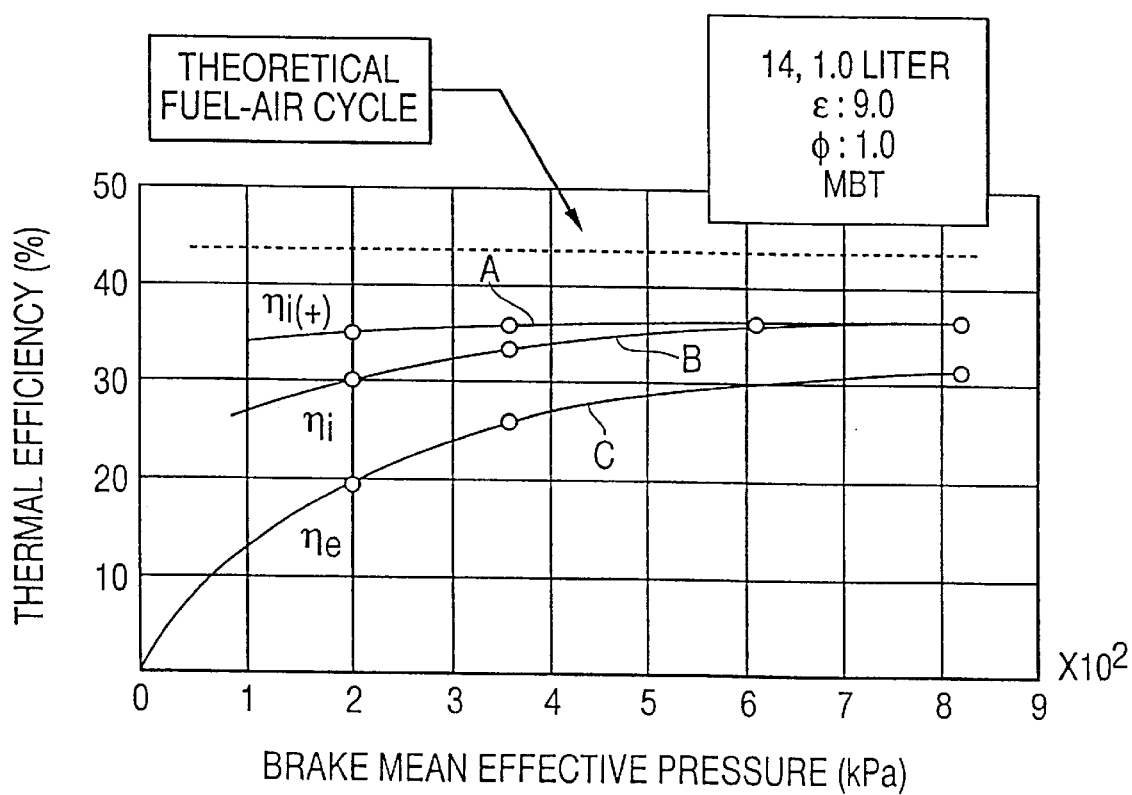
FIG. 1 is a graph of efficiency versus power for a standard piston engine.
Figure 2:
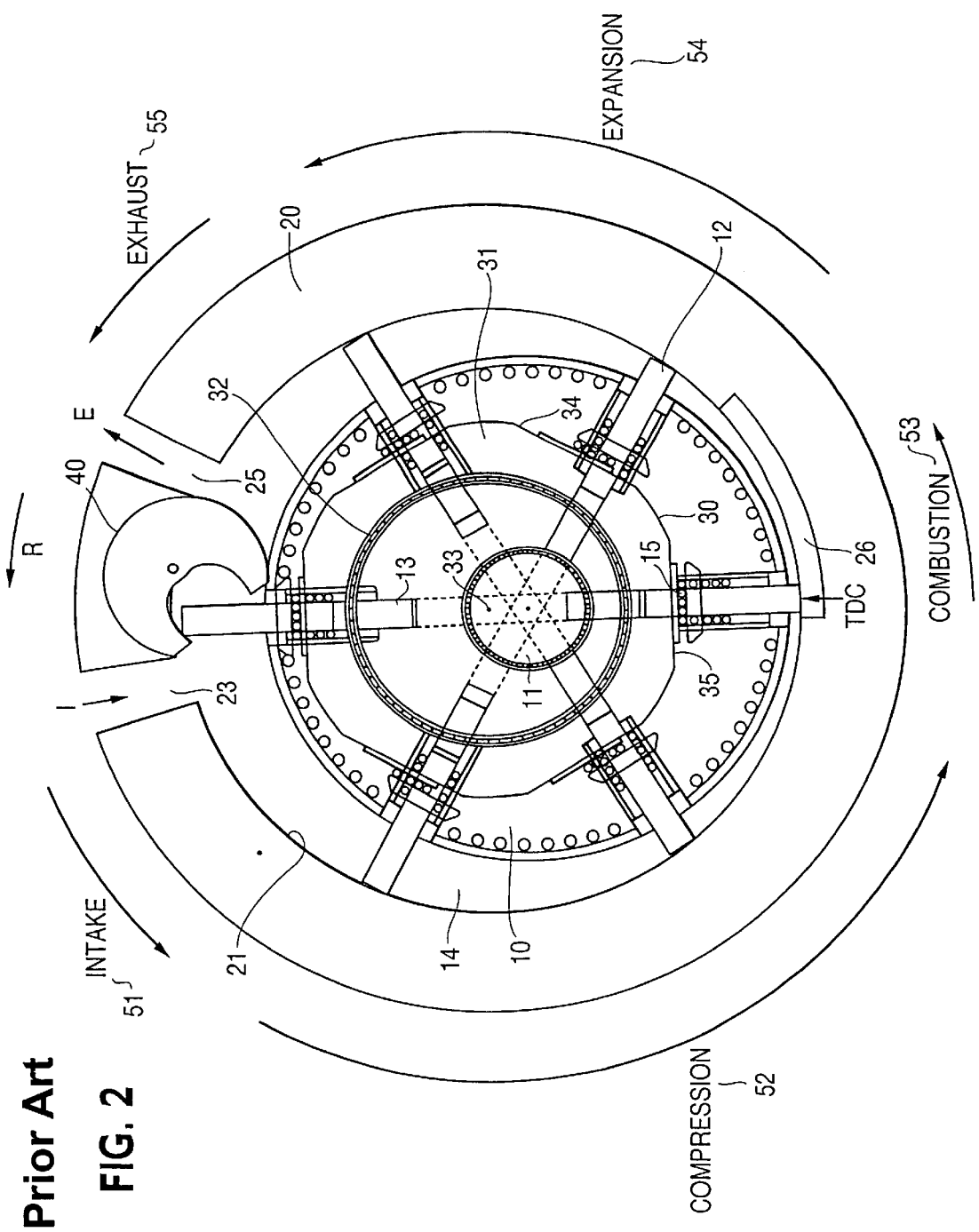
FIG. 2 is a side cross sectional view of a conventional rotary vane engine.
Figure 3:
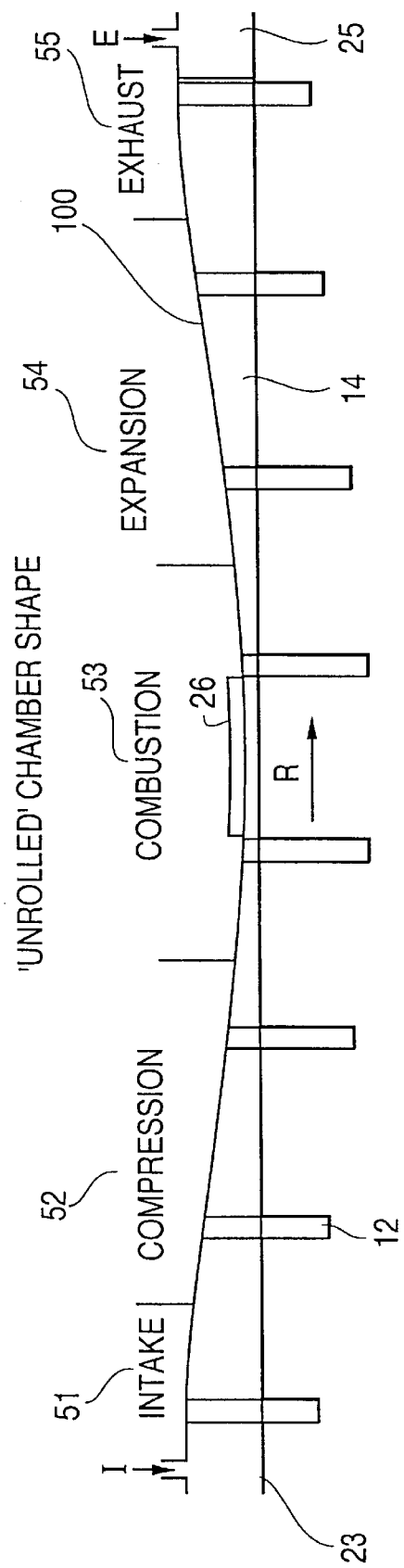
FIG. 3 is an unrolled view of the cross-sectional view of FIG. 2.

A properly configured rotary vane engine can provide many advantages over a conventional piston engine. However, it would be desirable to allow the rotary vane engine to more efficiently operate at reduced loads, without employing a vacuum throttle plate, without significantly altering the local fuel-air ratio, and performing this function over a wide range of loads, speeds, and operating conditions.

One solution to this problem is to introduce only a discrete band of mixed fuel and air inside a vane cell, rather than filling the entire cell with fuel and air. The band of mixed fuel and air is then adjoined by one or more, and preferably two bands of supplemental air, which remain largely separate from the mixed fuel and air. The supplemental air is primarily fresh air, but may contain some combusted and/or non-combusted fuel-air mixture. This configuration yields striated charges of discrete fuel-air combinations.

During power reduction a reduced amount of fuel is introduced into the vane cell, resulting in less power during combustion. However, there is no need to create a vacuum or decrease the local fuel-air ratio to the primary charge. The overall fuel-air ratio is reduced while the local fuel-air ratio is largely maintained. The local fuel-air ratio may also be adjusted or optimized for differing operating conditions. However, the primary power control can derive from varying the width of the primary charge and thereby varying the overall fuel-air ratio.

The width of mixed fuel and air, i.e., the combustion portion of the vane cell, largely determines the power level of the engine's operation. The greater the width of the combustion portion, the more fuel is used for combustion, and the higher the engine output. The narrower the width of the combustion portion, the less fuel is used for combustion, and the lower the engine output. Essentially, the width of the combustion portion acts as the functional throttle for this vane rotary engine without having to employ a conventional vacuum throttle plate.

In operation, while the band of mixed air and fuel that forms the combustion portion will spread out a little during a full set of engine cycles, it will generally tend to remain unmixed with the surrounding supplemental air portions because of the desirable flowpath and induction characteristics largely unique to the vane engine. As a result, no particular internal precautions or mechanisms are required to keep the two portions separated once contained within the vane cell.

Reference will now be made in detail to an embodiment of a rotary combustion engine incorporating a variable bandwidth striated charge, an example of which is illustrated in the accompanying drawings. The embodiment described below may be incorporated in all rotary-vane or sliding vane pumps, including vacuum pumps, compressors, generators, blowers, and engines, including internal combustion engines.

U.S. Pat. Nos. 5,524,586, 5,524,587, 5,727,517, 5,836,282, 5,979,395, and 6,036,462, all to Mallen, U.S. patent application Ser. No. 09/185,706, to Mallen, filed Nov. 11, 1998, entitled "Cooling System for a Rotary Vane Pumping Machine," U.S. patent application Ser. No. 09/185,707, to Mallen, filed Nov. 11, 1998, entitled "Vane Slot Roller Assembly for Rotary Vane Pumping Machine and Method for Installing Same," U.S. patent application Ser. No. 09/258,791, to Mallen, filed Mar. 1, 1999, entitled "Vane Pumping Machine Utilizing Invar-Class Alloys for Maximizing Operating Performance and Reducing Pollution Emissions," U.S. patent application No. 09/302,512, to Mallen, filed Apr. 30, 1999, entitled "Rotary Positive-Displacement Scavenging Device for a Rotary Vane Pumping Machine," U.S. patent application Ser. No. 09/185,705, to Mallen, filed Nov. 4, 1998, entitled "Rotary-Linear Vane Guidance in a Rotary Vane Pumping Machine," and U.S. patent application Ser. No. 09/631,882, to Mallen, filed Aug. 2, 2000, entitled "Hot Wall Combustion Insert for a Rotary Vane Pumping Machine" are hereby incorporated by reference in their entirety. For ease of discussion, certain portions of these patents and applications will be reiterated below where appropriate.

Figure 4:
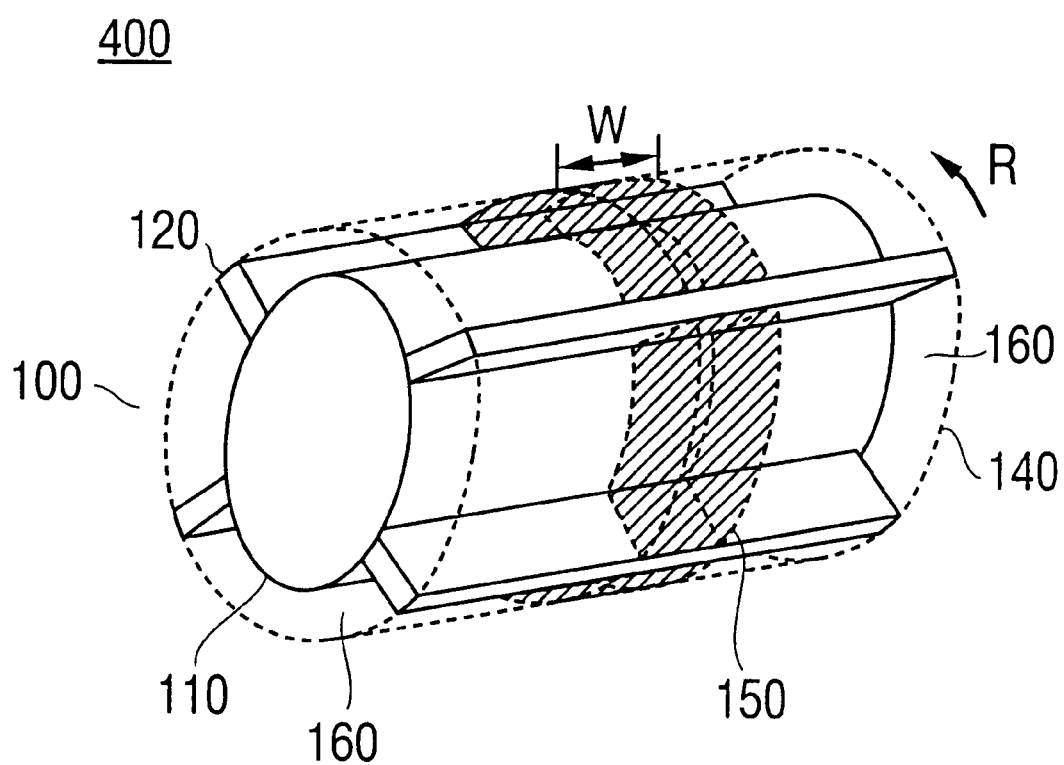
FIG. 4 is a perspective view of a rotor portion of a rotary vane engine according to a preferred embodiment of the present invention.

An exemplary embodiment of a vane rotary engine assembly incorporating a rotary-linear vane guidance mechanism and a rotary scavenging device is shown in FIG. 4.

As shown in FIG. 4, the vane rotary engine 400 includes a rotor 100 having a rotor shaft 110 and a plurality of vanes 120. The vanes 120 define a plurality of vane cells 140. Each vane cell includes a combustion portion 150 and one or more supplemental air portions 160. The combustion portion 150 includes a fuel-air mixture having a width W corresponding to the desired output level for the vane rotary engine 400. The supplemental air portions 160 fill up the rest of each vane cell 140.

As the vane rotary engine 400 operates, the fuel and air in the combustion portion 150 passes through all of the cycles of operation, intake 51, compression 52, combustion 53, expansion 54, and exhaust 55. The combustion cycle 53 may be performed using a conventional combustion method or a hot wall insert planar combustion design.

The rotor 100 and rotor shaft 110 rotate about a rotor shaft axis in a counter clockwise direction as shown by arrow R in FIG. 4. It can be appreciated that when implemented, the engine assembly could be adapted to allow the rotor 100 to rotate in a clockwise direction if desired.

One challenge with this separation of a fuel-air mixture and fresh air in the intake portion, however, involves the operation of a catalytic converter, if such a device is connected to the engine. A catalytic converter must receive gas at approximately 200° C. or higher to function properly. The cool supplemental air that exits from the supplemental air portions 160 of the vane cells 140 may not be at this temperature.

If the cool air is not heated up, it could reduce the effective temperature of the output of the engine 400 to a point where an attached catalytic converter would not work effectively. For example, if the engine 400 is running at a sufficiently low power level, the temperature of the cool supplemental air may lower the average temperature of the output gas or portions of the catalyst below approximately 200° C.

A solution to this problem is to keep the exhaust from the combustion portion 150 and the cool supplemental air portions 160 separate. In particular, the preferred embodiment of the present invention provides a mechanism similar to that used to create the combustion portion 150 to isolate the exhaust from the supplemental air portions 160. The exhaust from the cool supplemental air portions 160 is taken separately and is recirculated back into the fresh air input, preferably passing through a heat exchanger or intercooler to provide a cool temperature to the incoming air. In alternate embodiments, this recirculation process need not be performed.

Figure 5:
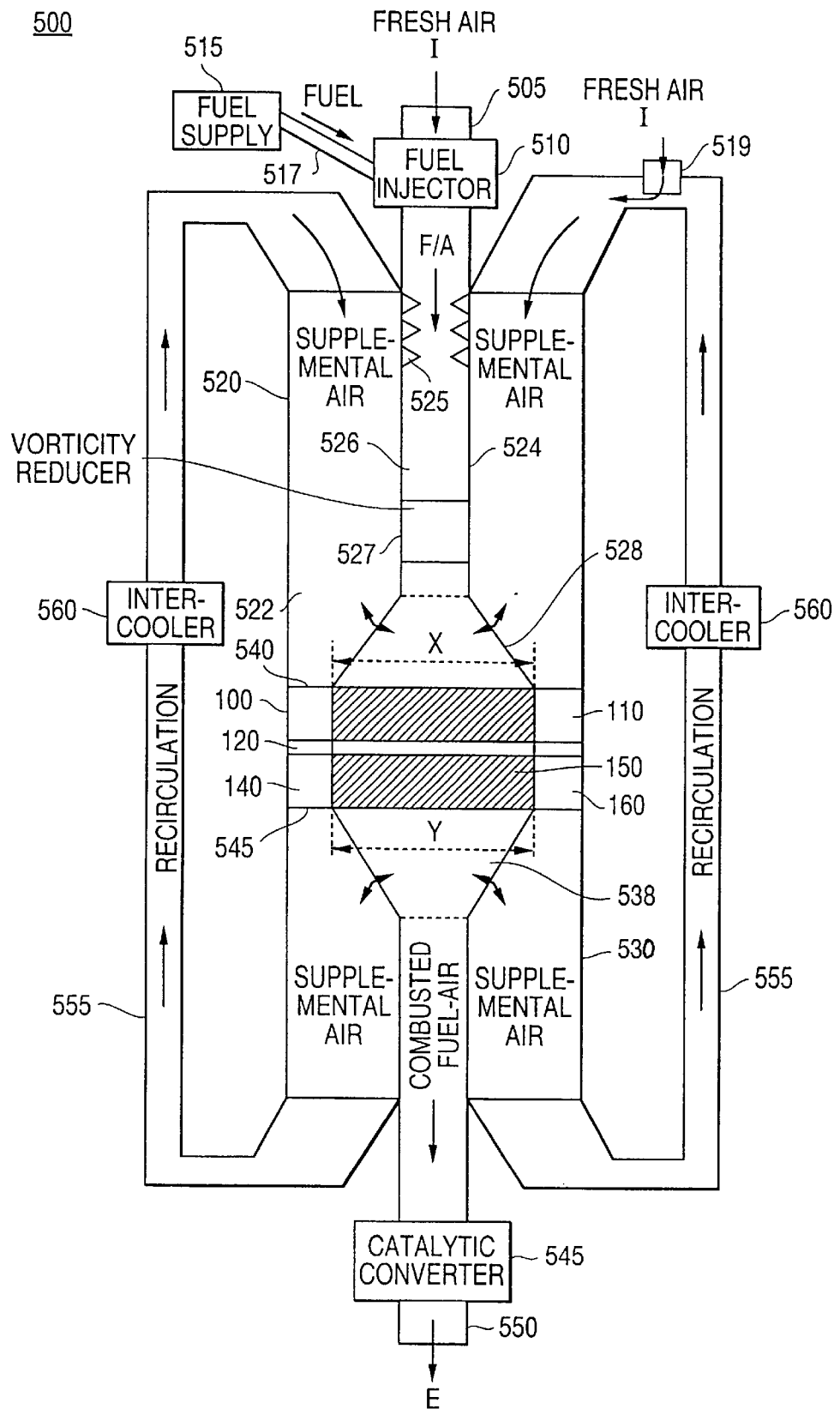
FIG. 5 is a flow process diagram of a plan view of an air intake/exhaust system for use with a rotary vane engine according to a preferred embodiment of the present invention.

One way to generate a band of mixed fuel and air is by providing a fuel and air supply line within a fresh air supply line, as shown by the preferred embodiment of the invention shown in the flow process diagram of FIG. 5.

The rotary vane engine 500 shown in FIG. 5 includes a rotor 100, a primary fresh air intake line 505, a fuel injector 510, a fuel supply 515, a fuel supply line 517, a secondary fresh air intake line 519, an intake mechanism 520, an exhaust mechanism 530, an intake port 540, an exhaust port 543, a catalytic converter 545, a final exhaust line 550, and a pair of supplemental air recirculation lines 555, and a pair of intercoolers 560.

The rotor 100 includes a rotor shaft 110 and a plurality of vanes 120 that define a plurality of vane cells 140. As noted above, each vane cell 140 includes a combustion portion 150 and a supplemental air portion 160.

The intake mechanism 520 comprises a first supplemental air line 522, a fixed-width intake line 524, and a variable-width intake line 528. The fixed-width intake line 524 is connected to the variable-width intake line 528 to allow the intake charge to flow through to the vane cell 140. The first supplemental air line 522 provides air to the portion of the vane cell 140 not being directly fed an air-fuel charge by the variable-width intake line 528. It will be understood by one skilled in the art that the location of the fixed-width intake line 524 and the first supplemental air line 522 with respect to each other may be varied according to design choice.

The fixed-width intake line 524 may include one or more vortex generators 525, a mixing portion 526, and one or more vorticity reducers 527.

The exhaust mechanism 530 includes a second supplemental air line 532, a fixed-width exhaust line 534, and a variable-width exhaust line 538. The fixed-width exhaust line 534 is connected to the variable-width exhaust line 538 to allow the combusted fuel-air charge to flow from the vane cell 140. The second supplemental air line 532 receives gas from the portion of the vane cell 140 not directly feeding the combusted fuel-air charge to the variable-width exhaust line 538. It will be understood by one skilled in the art that the location of the fixed-width exhaust line 534 and the second supplemental air line 532 with respect to each other may be varied according to design choice.

The intake port 540 is an opening in the vane engine in close proximity to the vane cells 140, permitting the induction of all intake air, gas, and fuel into the vane cells 140. The exhaust port 543 is an opening in the vane engine in close proximity to the vane cells 140, permitting the outflow of air, gas, and fuel from the vane cells 140.

Fresh air "I" is taken into the vane engine 500 through the primary fresh air intake line 505 and is provided to the fuel injector 510. There, the fresh air "I" is combined with fuel obtained from the fuel supply 515 via the fuel supply line 517. The fuel may be injected or inducted by any means known to the art, such as, by way of example, pressurized fuel injection, vacuum induction or carburetion, atomization devices, ultrasonic devices, thermal devices, hot plate injection, etc. The combined fuel and air is then provided to the intake line 512, which connects directly to the fixed-width intake line 524.

The fuel and fresh air are combined into a mixed fuel-air charge in the fixed-width intake line 524, preferably by the one or more vortex generators 525 followed by a mixing portion 526, such that the fuel and air are fully mixed. The fuel and fresh air may have their vorticity increased by the vortex generators 525, and then are allowed to combine in the mixing portion 526, which is preferably a further section of duct.

The fuel and air mixing preferably takes place before the charge is provided in the vane cells 140, so that there is reduced turbulence within the cells 140. In alternate embodiments, different means of mixing air and fuel can be used, and the mixing can also take place prior to the intake mechanism 520, if desired.

A vorticity reducer 527 is preferably provided to substantially eliminate vortices prior to induction into the vane cell, after mixing has been achieved upstream of the vane cell, so as to maximize the integrity and separation of the discrete striated charges within the vane cells.

Figure 6:
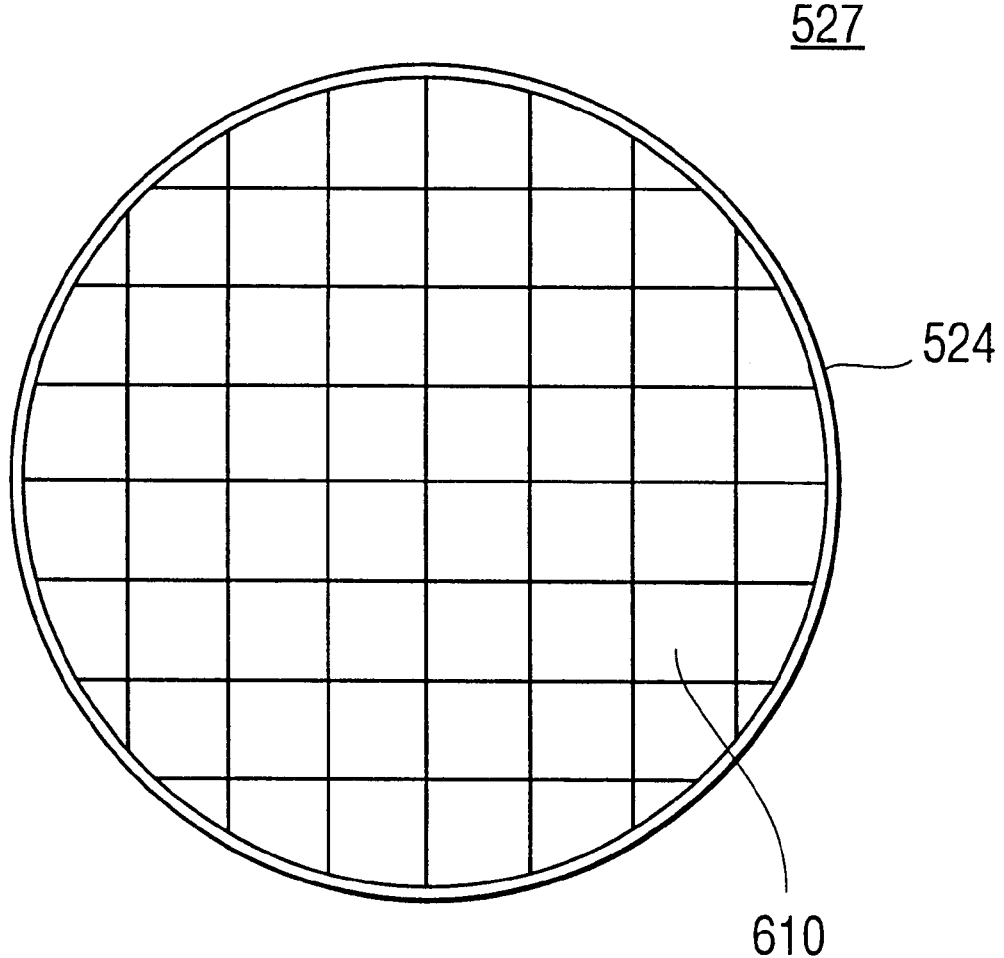
FIG. 6 is a cutaway view of the vorticity reducer of FIG. 5.

As shown in FIG. 6, such a vorticity reducer 527 may comprise, by way of example and not limitation, a grid of smaller passages 610 housed within the intake line 524 through which the mixed fuel and air can flow. The vorticity reducer 527 is located downstream of vortex generators 525, with sufficient passage number, length and narrowness to substantially reduce or eliminate mixing vorticity.

Once the fuel and air are combined into a mixed charge, they are provided to the variable-width intake line 528, which provides the mixed charge to the combustion portion 150 of each of the vane chambers 140 at a desired first width x in the intake portion of the cycle.

The charge then passes through the various stages of intake 310, compression 320, combustion 330, expansion 340, and exhaust 350 by rotating via the rotor 100. At the exhaust cycle 350 of the engine's operation, the width of the combustion portion 150 will have expanded slightly to have a second width of y, but should remain largely separate from the supplemental air portion 160.

During the exhaust cycle 350 of the engine's operation, the combusted fuel-air mixture is provided to the variable-width exhaust line 538, which is adjusted to have a second width y slightly larger than the first width x of the variable-width intake line 528.

The variable width exhaust line 538 provides the combusted gas to the final exhaust line 550 via the fixed-width exhaust line 534 and the exhaust line 540. In the preferred embodiment a catalytic converter 545 is interposed between the exhaust line 540, and the final exhaust line 550. However, in alternate embodiments, the catalytic converter 545 could be omitted.

As the fuel-air charge is being provided to the vane cells 140 for the combustion portion 150, supplemental air is provided to the supplemental air portion 160 in each vane cell 140 via the first supplemental air line 522, also at the intake cycle 310 of the engine operation. During the exhaust cycle 350 of the engine's operation, the supplemental air in the supplemental air portion 160 of each vane cell 140 is provided to a second supplemental air line 532, from which point the air is recycled back to the first supplemental air line 522 via the supplemental air recirculation lines 555. Supplemental air lines 522 and 532 are drawn as both right and left, and before and after.

The right and left portions of the supplemental air lines 522 and 532 need not necessarily communicate with each other, although they may. In addition, the supplemental air lines 522 and 532 themselves may be connected via the supplemental air recirculation lines 555, or they may operate with the first supplemental air lines 522 taking in supplemental air, and the second supplemental air line 532 exhausting the supplemental air. Also, the second supplemental air line 532 and the supplemental air recirculation lines 555 could be formed as a single unit that takes the exhaust supplemental air and recirculates it back into the first supplemental air line 522.

As air volumes fluctuate in the recirculation cycle of supplemental air, one or more secondary fresh air intake lines 519 provide a source of fresh air I to normalize the supplemental air pressure. In an alternative embodiment, the primary fresh air intake line 505 and the secondary fresh air intake line 519 may actually be formed from a single pipe.

Furthermore, one or more intercoolers 560 may be placed along the supplemental air recirculation lines 555 to cool the supplemental air as it passes through. Although the supplemental air will remain cooler than the combusted gas, it will nevertheless increase slightly in temperature as it passes through the intake mechanism 520, supplemental air portion 160, and exhaust mechanism 530. Therefore is desirable to use intercoolers 560 to maintain the supplemental air at a desired temperature. In an alternative embodiment, however, the intercoolers 560 are omitted.

In addition, the intake mechanism 520, exhaust mechanism 530, and supplemental air recirculation lines 555 may be varied according to the needs of a given engine design. In fact, there are countless permutations of ducting known to those skilled in the art which would fall within the scope of the present invention.

As noted above, after the combustion and expansion cycles 330 and 340, the combustion portion 150 of the vane cells 140 will have expanded in width somewhat from a first width x to a second width y. As a result of this, the supplemental air portions 160 will be reduced in width by a similar amount in total. In the preferred embodiment, the variable-width intake and exhaust lines 528 and 538 comprise two movable walls fixed on hinges attached to the fixed-width intake and exhaust lines 524 and 534, respectively. These walls will swivel outward or inward to vary the width of the combustion portion 150 when the fuel-air charge is provided to the vane cell.

In an alternative embodiment, however, a single movable intake or exhaust wall could be used with a stationary intake or exhaust wall. The movable wall could then be moved with respect to the stationary wall to either vary the width x or y, as appropriate.

Figure 7:
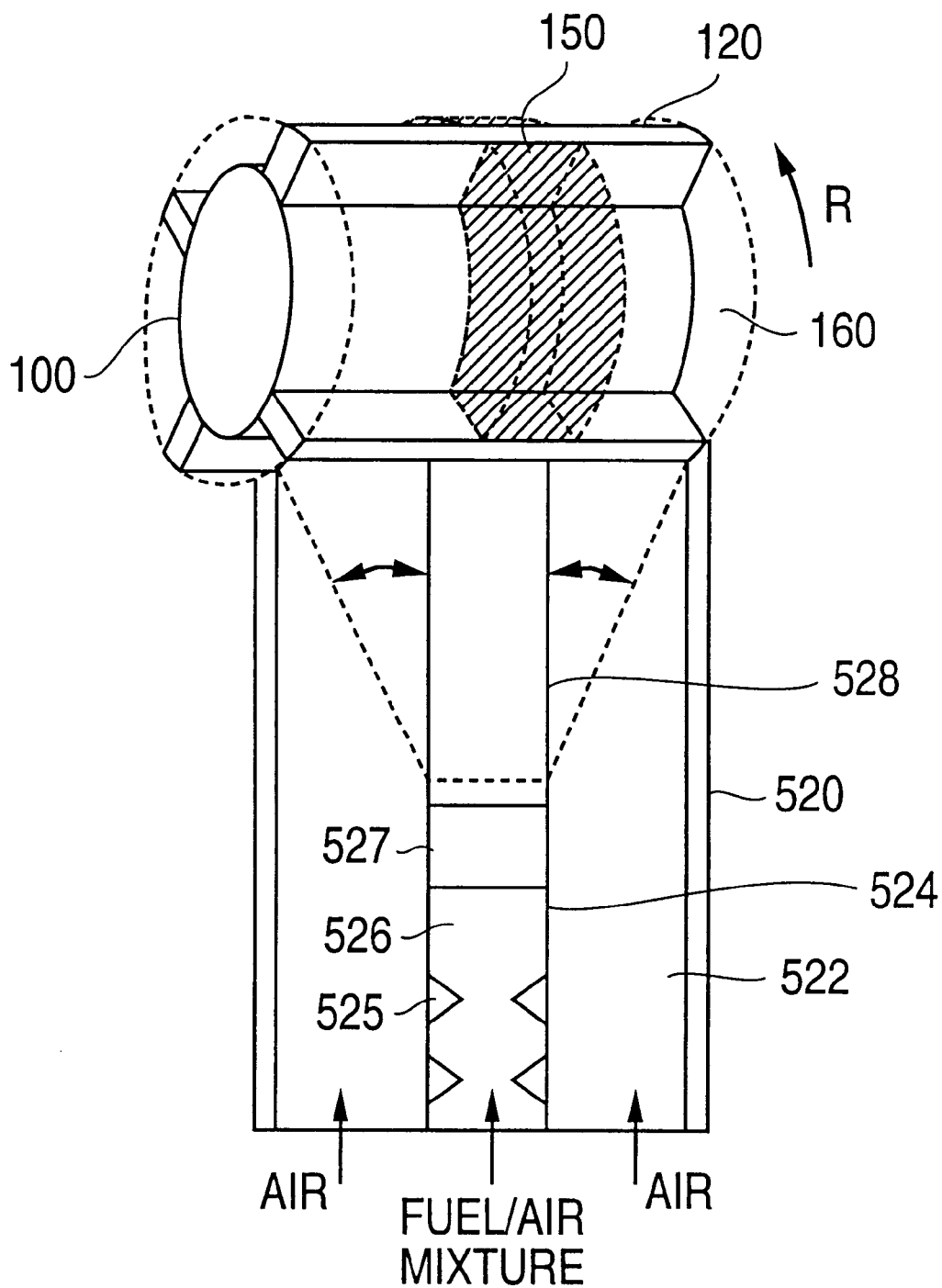
FIG. 7 is a plan view of the air intake system of FIG. 5 for use at low power.
Figure 8:
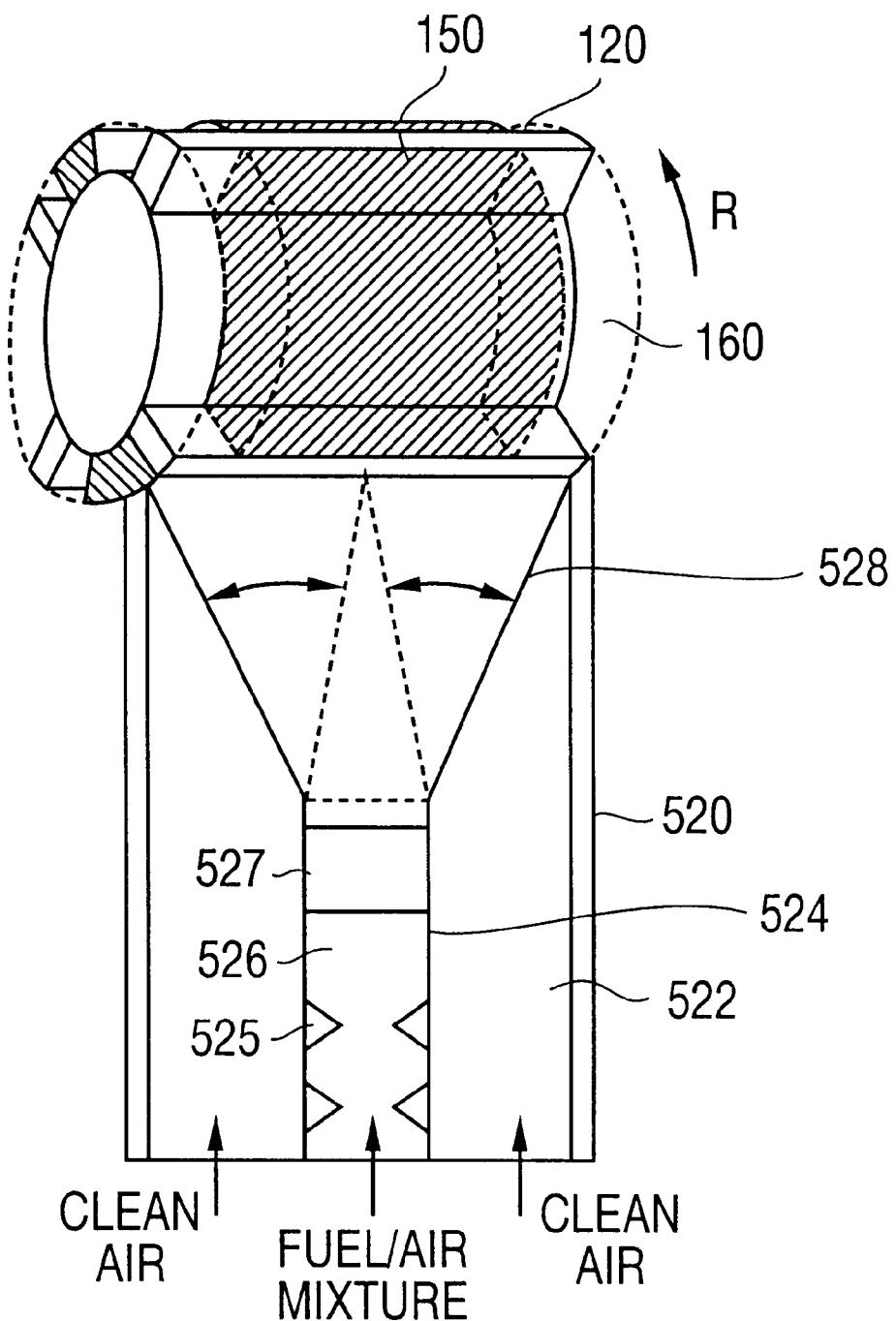
FIG. 8 is a plan view of the air intake system of FIG. 5 for use at high power.

FIGS. 7 and 8 are plan views of the air intake system of FIG. 5 for use at low power and high power, respectively. As seen in FIG. 7, the walls of the variable-width intake line 528 are swung in to make the output of the variable-width intake line 528 facing the vane cells 140 very narrow. As a result of this, the resulting combustion portion 150 in the vane cell 140 will be very narrow, the corresponding supplemental air portions 160 will be large, and the output power of the engine will be very low.

To contrast, in FIG. 8, the walls of the variable-width intake line 528 are swung out to make the output of the variable-width intake line 528 facing the vane cells 140 very wide. As a result, the combustion portion 150 in the vane cell 140 will be wide, the corresponding supplemental air portions 160 will be small, and the output power of the engine will be very high. Thus, the variable-width intake line 528 can be used as a throttle to control the output power of the vane engine.

The variable-width exhaust line 538 will operate in conjunction with the variable-width intake line 528. Its operating width will always be slightly larger than the operating width of the variable-width intake line 528, except when the throttle is at full power, when both the variable-width intake and exhaust lines 528 and 538 will be open to maximum width.

Although the preferred embodiment uses hinged walls for the first and second variable-width lines 228 and 238, alternative designs known in the art of flow control may be used. By way of example and not limitation, any walls of the variable-width lines 528 and 538 may move laterally, while remaining parallel to each other, to create air pathways having the desired width; alternatively, combined components of linear and/or pivoting, bending, flexing, constriction, expansion, or arcuate motion may be employed in the relative movement of the wall or walls.

The engine retains separate combustion portions 150 and supplemental air portions 160 in the vane cells 140 because the primary vane cell mixing dynamics in the operation of the vane engine involve radial and azimuthal mixing dynamics, rather than axial. This means that while radial cross sections of the vane cell will be well-mixed, axial cross sections will tend to retain their separation. As a result, the band of mixed fuel in the combustion portion 150 and the band of supplemental air in the supplemental air portions 160 will remain largely discrete in an axial direction.

Referring to FIG. 1, this design improves upon a conventional SI engine by virtually eliminating line B by displacing it almost to the position of line A by largely eliminating the vacuum pumping losses at partial load. Line C, i.e., the final efficiency, then moves very close to line A, since the mechanical efficiency of the present vane engine is extremely high. However, by definition, line C will continue to taper off and intersect the origin at very light loads, i.e., at idle.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A rotary vane combustion engine comprising:

a rotor having a plurality of vanes spaced from each other in a circumferential direction of the rotor;

a stator enclosing the rotor to form a plurality of vane cells between the plurality of vanes;

said rotor and said stator being rotatable relative to each other about an axis of rotation, and the width of each of said vane cells lying in the direction of said axis of rotation;

one or more intake ports for providing an intake charge to the vane cells;

one or more exhaust ports for removing exhaust gas from the vane cells; and a variable bandwidth fuel-air source connecting a source of a fuel and air mixture to at least one of the intake ports, said variable bandwidth fuel-air source comprising an intake line having an effective width, in the direction of said axis of rotation, that can be varied such that the variable bandwidth fuel-air source can selectively provide to the plurality of vane cells any one of discrete bands of a fuel and air mixture of respective widths that differ in the direction of said axis of rotation.

2. A rotary vane combustion engine, as recited in claim 1, wherein the one or more intake ports further comprises one or more supplemental air lines for providing supplemental air to a portion of the plurality of vane cells not filled with the selected discrete band of mixed fuel and air.

3. A rotary vane combustion engine, as recited in claim 2, wherein the variable width intake line comprises first and second movable intake walls that vary the width of the discrete band of mixed fuel and air provided to each of the plurality of vane cells.

4. A rotary vane combustion engine, as recited in claim 3, wherein the variable bandwidth fuel-air source further comprises first and second fixed intake hinges to which the first and second movable intake walls are attached, respectively, and each of which intake walls can rotate via said hinges to vary the width of the discrete band of mixed fuel and air provided to each of the plurality of vane cells.

5. A rotary vane combustion engine, as recited in claim 3, wherein the first and second movable intake walls are moved laterally with respect to each other, such that each remains parallel to the other, to vary the width of the discrete band of mixed fuel and air provided to each of the plurality of vane cells.

6. A rotary vane combustion engine, as recited in claim 1, wherein the variable width intake line comprises a movable intake wall, and a stationary intake wall, wherein the movable intake wall moves in relation to the stationary intake wall to vary the width of the discrete band of mixed fuel and air provided to each of the plurality of vane cells.

7. A rotary vane combustion engine, as recited in claim 1, and further comprising a fuel injector attached to the variable-width intake line for receiving fuel and fresh air and providing the mixed fuel and air.

8. A rotary vane combustion engine, as recited in claim 7, wherein the variable bandwidth fuel-air source further comprises a fixed width intake line formed between the fuel injector and the variable-width intake line, the fixed width intake line having at least one vortex generator for mixing the combined fuel and air.

9. A rotary vane combustion engine, as recited in claim 8, wherein the variable bandwidth fuel-air source further comprises a vorticity reducer downstream of the at least one vortex generator for straightening a flow of mixed fuel and air prior to induction into the vane cell.

10. A rotary vane combustion engine, as recited in claim 9, wherein the vorticity reducer comprises a grid of separate passages housed within the intake line through which mixed fuel and air can flow.

11. A rotary vane combustion engine, as recited in claim 9, wherein the variable bandwidth fuel-air source further comprises a mixing portion formed between the at least one vortex generator and the vorticity reducer to allow vortices generated by the at least one vortex generator to further mix the combined fuel and air.

12. A rotary vane combustion engine, as recited in claim 9, wherein the temperature of the combusted fuel-air mixture is maintained at 200° C. or greater.

13. A rotary vane combustion engine, as recited in claim 1, wherein the one or more exhaust ports includes one or more supplemental air exhaust ports for removing supplemental air, and a combusted gas exhaust port for removing a combusted fuel-air mixture.

14. A rotary vane combustion engine, as recited in claim 13, wherein the combusted gas exhaust port further comprises a variable-width exhaust line for removing the combusted fuel-air mixture from the plurality of vane cells, along an exhaust width of the vane cells lying in said direction of the axis of rotation of the rotor.

15. A rotary vane combustion engine, as recited in claim 14, wherein the exhaust width is greater than the axial width of the discrete band of mixed fuel and air selected by the variable bandwidth fuel-air source.

16. A rotary vane combustion engine, as recited in claim 14, wherein the variable width exhaust line comprises first and second movable walls that vary the exhaust width.

17. A rotary vane combustion engine, as recited in claim 16, wherein the first and second movable exhaust walls are attached to first and second fixed exhaust hinges, respectively and each of which exhaust walls can rotate via said hinges to vary the exhaust width.

18. A rotary vane combustion engine, as recited in claim 16, wherein the first and second movable exhaust walls are moved laterally with respect to each other, such that each remains parallel to the other, to vary the exhaust width.

19. A rotary vane combustion engine, as recited in claim 14, wherein the variable width exhaust line comprises a movable exhaust wall, and a stationary exhaust wall, wherein the movable exhaust wall moves in relation to the stationary exhaust wall to vary the exhaust width.

20. A rotary vane combustion engine, as recited in claim 13, and further comprising a catalytic converter connected to the combusted gas exhaust port.

21. A rotary vane combustion engine, as recited in claim 1, and further comprising a supplemental air recirculation line between the one or more exhaust ports and the one or more intake ports for carrying supplemental air from the one or more exhaust ports to the one or more intake ports.

22. A rotary vane combustion engine, as recited in claim 21, and further comprising an intercooler disposed along the supplemental air recirculation line for cooling the supplemental air.

* * * * *